United States Patent
Beall et al.

(10) Patent No.: US 7,141,089 B2
(45) Date of Patent: Nov. 28, 2006

(54) MAGNESIUM ALUMINUM SILICATE STRUCTURES FOR DPF APPLICATIONS

(75) Inventors: Douglas M. Beall, Painted Post, NY (US); Gregory A. Merkel, Painted Post, NY (US); Martin J. Murtagh, Trumansburg, NY (US)

(73) Assignee: Corning Incorporated, Corning, NY (US)

( * ) Notice: Subject to any disclaimer, the term of this patent is extended or adjusted under 35 U.S.C. 154(b) by 171 days.

(21) Appl. No.: 10/606,708

(22) Filed: Jun. 26, 2003

(65) Prior Publication Data

US 2004/0029707 A1    Feb. 12, 2004

Related U.S. Application Data

(60) Provisional application No. 60/392,699, filed on Jun. 26, 2002.

(51) Int. Cl.
*B01D 46/00* (2006.01)
*F01N 3/022* (2006.01)

(52) U.S. Cl. .............. 55/523; 55/282.2; 55/282.3; 55/385.3; 55/DIG. 5; 55/DIG. 10; 55/DIG. 30; 60/311; 264/628; 264/631; 264/638; 264/44; 264/653; 264/DIG. 48

(58) Field of Classification Search ............ 55/282.2, 55/282.3, 385.3, 523, 524, DIG. 10, DIG. 30, 55/DIG. 5; 501/9, 81, 118, 119, 128; 264/631, 264/638, 44, 653, 699, DIG. 48, 628; 60/311
See application file for complete search history.

(56) References Cited

U.S. PATENT DOCUMENTS

| | | |
|---|---|---|
| 4,280,845 A | 7/1981 | Matsuhisa et al. |
| 5,114,643 A | 5/1992 | Beall et al. |
| 5,114,644 A | 5/1992 | Beall et al. |
| 5,185,110 A * | 2/1993 | Hamaguchi et al. .......... 264/44 |
| 5,258,150 A | 11/1993 | Merkel et al. |
| 5,925,156 A | 7/1999 | Motoki et al. |
| 6,087,281 A * | 7/2000 | Merkel ........................ 501/9 |
| 6,210,626 B1 | 4/2001 | Cornelius et al. |
| 6,773,481 B1 | 8/2004 | Noguchi et al. |
| 2002/0004445 A1* | 1/2002 | Beall et al. ................. 501/119 |

FOREIGN PATENT DOCUMENTS

| | | |
|---|---|---|
| EP | 0 391 321 | 10/1990 |
| WO | 01/91882 | 12/2001 |
| WO | WO 01/91882 A1 * | 12/2001 |
| WO | WO 02/41972 A1 * | 5/2002 |

* cited by examiner

*Primary Examiner*—Jason M. Greene
(74) *Attorney, Agent, or Firm*—Randall S. Wayland; Anca C. Gheorghiu (57) ABSTRACT

A ceramic filter for trapping and combusting diesel exhaust particulates composed of an end-plugged cordierite honeycomb structure exhibiting a pore size distribution as determined by mercury porosimetry in which the quantity $d_{50}/(d_{50}+d_{90})$ as related to pore size distribution is less than 0.70, a soot loaded permeability factor $S_f$ as defined by the equation $[d_{50}/(d_{50}+d_{90})]/[\% \text{ porosity}/100]$, of less than 1.55, and, a coefficient of thermal expansion (25–800° C.) of no greater than $17 \times 10^{-7}$/° C. The ceramic filter further exhibits a median pore diameter, $d_{50}$, of at least 4 micrometers and up to 40 micrometers. A method of making the filter is provided.

34 Claims, 6 Drawing Sheets

MAGNESIUM ALUMINUM SILICATE STRUCTURES FOR DPF APPLICATIONS

This application claims the benefit of U.S. Provisional Application No. 60/392,699, filed Jun. 26, 2002, entitled "Magnesium Aluminum Silicate Structures for DPF Applications", by D. Beall, et al.

BACKGROUND OF THE INVENTION

The instant invention relates to magnesium aluminum silicate (MAS) type structures of low thermal expansion and optimized through-the-wall soot loaded permeability suitable for use in high temperature filtration applications. Specifically, the present invention relates to cordierite wall flow particulate filters having narrower pore size distributions and more interconnected porosity than commercially available cordierite wall flow filters.

A great deal of interest has been directed towards the diesel engine due to its efficiency, durability and economical aspects. However, diesel emissions have come under attack both in the United States and Europe, for their harmful effects on the environment and on humans. One of the biggest challenges in lowering diesel emissions is controlling the levels of diesel particulate material present in the diesel exhaust stream, which has been declared a toxic air contaminant.

Diesel particulate material is mainly carbon soot. One way of removing the carbon soot from the diesel exhaust is through diesel traps. The most widely used diesel trap is the diesel wall flow particulate filter which filters the diesel exhaust by capturing the soot on the porous walls of the filter body. The diesel particulate filter (DPF) is designed to provide for nearly complete filtration of soot without significantly hindering the exhaust flow. In the industry cordierite has been the cost-effective material of choice for DPFs due to its combination of excellent thermal shock resistance, filtration efficiency, and durability under most operating conditions.

As the layer of diesel particulate materials or carbon soot collects on the surfaces of the inlet channels of the filter, the lower permeability of the soot layer causes a gradual rise in the back pressure of the filter against the engine due to a pressure drop across the length of the filter. This causes the engine to work harder. Once the carbon soot in the filter has accumulated to some level, the filter must be regenerated by burning the soot to restore the back pressure to low levels. The higher the pressure drop across the filter the higher the back pressure against the engine.

For a given filter size and cell geometry, the rate at which pressure drop increases with soot loading depends on how the soot interacts with the pores in the wall of the filter. Commercially available cordierite DPFs designed for truck engines exhibit high pressure drops, necessitating a reduction thereof. It has been observed that filters made from ceramics having well interconnected pores that span a narrow range in pore diameter exhibit a lower pressure drop at a given soot loading than filters that have a broad range in pore size (as determined by mercury porosimetry).

It would be considered an advancement in the art to obtain a cordierite diesel particulate filter with the pore size distribution and pore connectivity capable of maintaining lower pressure drops than has been possible so far with commercially available cordierite DPFs, while still exhibiting low thermal expansion. The present invention provides such a filter and a method of making the same.

SUMMARY OF THE INVENTION

The instant invention is founded upon the discovery of a magnesium aluminum silicate (cordierite) diesel particulate filter possessing an optimized through-the-wall soot loaded permeability which results in lower pressure drops than have been achieved with commercially available cordierite filters. The "through-the-wall soot loaded permeability" is the gas permeability through a porous ceramic wall of the filter when that wall has been exposed to sufficient soot accumulation such that the soot has begun to build up a soot layer, or cake, on the inlet surface of the wall. The through-the-wall soot loaded permeability will be lower than the permeability of clean wall prior to soot deposition if there has been some deposition of soot within the pores below the inlet surface of the wall.

Lower pressure drops are obtained by tailoring the microstructure with a narrower pore size distribution and a more interconnected porosity. It has been found that in the present cordierite bodies reduced anisotropy in pore morphology and better pore connectivity is achievable by the replacement of some or all of the platy talc with a less platy magnesium oxide (MgO) component in combination with the use of a non-platy silica component. Further, the clay component is eliminated from the raw material mixture because it reacts unfavorably with the MgO to produce cordierite crystals that grow with their high-expansion crystallographic a-axes and b-axes in the plane of the filter wall which can lead to a high coefficient of thermal expansion in the final ceramic body. While pressure drops are lowered in the inventive filters, a low thermal expansion is still maintained to provide high thermal shock resistance.

Accordingly the inventive bodies are formed by a reaction of raw materials including MgO, alumina ($Al_2O_3$) and silica ($SiO_2$). Spinel may also be added. A pore former whether organic, such as starch, cellulose, and the like, or inorganic, such as, graphite, or a synthetic polymer, such as polyacrylate, polyethylene, and the like may also be included in the raw material batch. The batch is first plasticized and shaped, and then dried and fired to form a structure which is predominately of a phase approximating the stoichiometry of $Mg_2Al_4Si_5O_{18}$. The resulting ceramic honeycomb structure is then formed into a diesel particulate filter.

In a preferred embodiment the filter comprises a honeycomb design having an inlet end and an outlet end and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

DETAILED DESCRIPTION OF THE INVENTION

The present invention relates to a refractory ceramic structure or body which is predominately of a magnesium aluminum silicate phase, commonly known as cordierite. The inventive structure is particularly suitable in filtration applications, such as diesel exhaust filtration. The diesel particulate filter has preferably a body of a honeycomb structure which is obtained by extrusion.

Honeycombs of the present invention contain open cells which are formed by thin porous intersecting walls. The entirety of the open cells is enclosed by an outer wall which defines the shape of the body. The cells normally extend along the length of the body and occupy the entire length. There can be any number or density of cells. Preferably, the honeycombs have cell densities of at least 150 cells per square inch of frontal inlet area and a cell wall thickness of at least 0.012 inches.

A portion of the cells at the inlet end or face are plugged with a paste having same or similar composition to that of the filter, as described in U.S. Pat. No. 4,329,162 which is herein incorporated by reference. The plugging is only at the ends of the cells which is typically to a depth of about 5 to 20 mm, although this can vary. A portion of the cells on the outlet end but not corresponding to those on the inlet end are plugged. Therefore, each cell is plugged only at one end. The preferred arrangement is to have every other cell on a given face plugged as in a checkered pattern.

This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as "wall flow" filters since the flow paths resulting from alternate channel plugging require the exhaust being treated to flow through the porous ceramic cell walls prior to exiting the filter.

An advantage of the inventive filters is lower pressure drops than currently obtainable with commercially available cordierite DPFs. The pressure drop is a function of the accumulation of carbonaceous soot on the walls of the diesel particulate filter. As the amount of soot accumulated increases, it creates a progressive increase in the resistance to flow of the exhaust gas through the walls of the filter and carbon soot layer. This resistance to flow is manifested as a pressure drop that can be measured across the length of the filter, and results in an increased back pressure against the engine. The pressure drop increase at a given loading of soot (in grams/liter) is influenced by the porosity, the median pore diameter or size, the width of the pore size distribution, the pore connectivity, and the extent to which the soot penetrates the porosity of the filter walls.

In the inventive structures a low pressure drop (in kPa) is achieved through a combination of porosity and pore size distribution control, to result in an optimized through-the-wall soot loaded permeability. The pore size distribution, as determined by mercury intrusion porosimetry, is quantified in terms of $d_{10}$, $d_{50}$, and $d_{90}$ which are the pore diameters at 10%, 50%, and 90% mercury intrusion. Thus, $d_{10} > d_{50} > d_{90}$. The breadth of the fines in pore distribution is of particular interest to the through-the-wall soot loaded permeability. This is because the larger amount of fine pores for a given median pore diameter can be an indication that the pore microstructure is comprised of larger pores that are interconnected by narrow pore necks. Mercury intrusion only measures the diameter of the pore neck leading into a larger pore, but gives no indication of the diameter of the larger pore itself.

The width of the fine tail of the pore size distribution is related to the difference between $d_{50}$ and $d_{90}$. This can be expressed by the quantities $(d_{50}-d_{90})/d_{50}$, $d_{90}/d_{50}$ and $d_{50}/(d_{50}+d_{90})$. Division by $d_{50}$ serves to normalize the data such that two materials will have the same values if the widths of their pore size distributions appear similar by microscopy, but in which one material is of coarser overall microstructure, i.e., the microstructure of one look like a "magnified" version of the other.

For the inventive bodies, the term $d_{50}/(d_{50}+d_{90})$ has a value of less than 0.7, preferably less 0.65, and more preferably less than 0.60. The value of $d_{90}/d_{50}$ is greater than 0.40, preferably greater than 0.55, and more preferably greater than 0.60, and the value of $(d_{50}-d_{90})/d_{50}$ is less than 0.60, preferably less than 0.50, and more preferably less than 0.40. The value of $d_{50}$ pore diameter is at least 4 micrometers and up to 40 micrometers, preferably between 6 micrometers and 25 micrometers, and more preferably between 7 micrometers and 15 micrometers. Inventive bodies have a porosity, as measured in volume percent, at least 40% and less than 60%, preferably about 50%, and more preferably about 55%.

The pore size distribution together with the porosity of the inventive bodies satisfy the equation below which defines the soot loaded permeability factor, $S_f$:

$$S_f = [d_{50}/(d_{50}+d_{90})]/[\% \text{ porosity}/100].$$

The soot loaded permeability, $S_f$ has a value of less than 1.55, preferably between 0.83 and 1.40, more preferably between 0.83 and 1.35. It has been found that by satisfying the soot loaded permeability factor as described, inventive bodies maintain an especially low pressure drop during the accumulation of carbon soot within the filter. Although not intended to be bound by theory, it is believed that a narrow pore size distribution provides a greater pore connectivity together with a relatively low porosity serve to minimize penetration of the soot into the pores of the filter wall, and promote the formation of a layer or "cake" of soot on the surfaces of the walls of the inlet channels even at very low soot loadings. This is generally known as surface filtration, as compared to the so-called deep bed filtration, which involves penetration of the soot into the pores of the filter walls. Surface filtration is preferred because the cake or soot layer can be burned more easily and quickly when at the surface of the filter walls.

Because the pores are well interconnected, the body has a higher permeability and lower pressure drop than a filter having a similar median pore diameter and total porosity, but with a broader pore size distribution. When the median pore diameter is greater than about 20 microns or the total porosity is greater than about 50%, it may be possible for soot to penetrate more deeply into the pores in the walls of the filter. However, due to the improved pore connectivity of the inventive filters, it is believed that the soot which enters the pores is not as detrimental at reducing the permeability of gas through the wall because there are many more alternative passageways for the flow of gas through the wall.

Another advantage in the inventive bodies is a low thermal expansion resulting in excellent thermal shock resistance (TSR). TSR is inversely proportional to the coefficient of thermal expansion (CTE). That is, honeycomb structures with low thermal expansion have good thermal shock resistance and can survive the wide temperature fluctuations that are encountered in application. Accordingly, the coefficient of thermal expansion from room temperature (RT) to 800° C., as measured by dilatometry, is no greater than about $17 \times 10^{-7}/°$ C., preferably less than $10 \times 10^{-7}/°$ C., and more preferably less than $5 \times 10^{-7}/°$ C.

The inventive structure is suitable for both low and high volumetric heat capacity filters. High volumetric heat capacity is often desirable because it reduces the magnitude of the temperature increase of the filter during regeneration. Accordingly, it is preferred to have a filter volumetric heat capacity of at least 0.67 J cm$^{-3}$ K$^{-1}$ as measured at about 500° C. Preferably, the filter volumetric heat capacity at 500° C. is at least 0.76 J cm$^{-3}$ K$^{-1}$, and more preferably at least 0.85 J cm$^{-3}$ K$^{-1}$. Alternatively, low volumetric heat capacity is sometimes desirable because it enables the filter to regenerate more frequently and with lower amounts of accumulated soot without requiring large inputs of thermal energy to raise the temperature of the filter to that required to initiate regeneration.

The invention also relates to a method of fabricating the filter structures by reaction of raw materials selected from the group consisting of magnesium oxide, alumina, and silica components. Spinel may be optionally included. If included the spinel component has the stoichiometry $MgAl_2O_4$. The raw material batch optionally includes a pore former that is preferably a particulate material selected from the group consisting of graphite, cellulose, starch, synthetic polymers such as polyacrylates and polyethylenes, and combinations thereof.

The weight percent of the pore former is computed as: 100×[weight of pore former/weight of cordierite-producing raw materials]. Graphite and corn starch are preferred pore formers. The median particle diameter of the pore former is at least 3 micrometers and not more than 140 micrometers, preferably at least 5 micrometers and not more than 80 micrometers, and more preferably at least 10 micrometers and not more than 50 micrometers. When the silica source has a median particle diameter greater than 20 micrometers, the pore former must have a median particle diameter of not more than 100 micrometers.

The magnesium oxide is supplied by a MgO-forming source which is typically magnesium oxide, magnesium hydroxide, magnesium carbonate, magnesium nitrate, or combinations of these. The alumina is supplied by an $Al_2O_3$-forming source which when heated to a sufficiently high temperature in the absence of other raw materials, yields substantially pure aluminum oxide, and can be aluminum oxide, aluminum hydroxide, hydrated alumina, alpha alumina, a transition alumina such as gamma-alumina or rho-alumina, boehmite, aluminum nitrate, aluminum carbonate or combinations of these. The silica is supplied by a silica-forming source, including quartz, cristobalite, non-crystalline silica such as fused silica or a sol-gel silica, zeolite, colloidal silica, alpha quartz, and mixtures thereof. The silica source has an average particle size of at least about 4 micrometers, and preferably greater than about 10 micrometers.

The raw material mixture is intimately blended with a vehicle and forming aids which impart plastic formability and green strength to the raw materials when they are shaped into a body. Since forming is by extrusion, extrusion aids are used, most typically methyl cellulose which serves as a binder, and sodium stearate, which serves as a lubricant. The relative amounts of forming aids can vary depending on factors such as the nature and amounts of raw materials used, etc. Forming aids are added as superadditions based on the total weight of the raw materials. In one embodiment, extrusion aids and amounts include 2% to 10% by weight of methyl cellulose, and preferably 3% to 6% by weight, and 0.5% to 1% by weight sodium stearate, and preferably 0.6% by weight.

The raw materials and the extrusion aids are mixed together in dry form and then mixed with water as the vehicle. The amount of water can vary from one batch of materials to another and therefore is determined by pre-testing the particular batch for extrudability.

The raw materials in the resulting plastic mixture are then formed into a green body. Bodies which have not been sintered are referred to as green bodies. Extrusion techniques are well know in the art. The green bodies are dried and then fired at a sufficient temperature and for a sufficient time to form the final product structure. The firing is preferably done at a rate of between 15 and 100° C./hour to a maximum temperature of about 1405° C. to 1430° C., and with a hold at top temperature for 6 to 25 hours. The compositions of the present invention result in formation of a ceramic structure which is predominately of a phase approximating the stoichiometry $Mg_2Al_4Si_5O_{18}$.

To more fully illustrate the invention, the following non-limiting examples are present below. All parts, portions and percentages are on a weight bases unless otherwise stated.

EXAMPLES

Table 1 presents the raw materials utilized in preparing the samples herein. Comparative (non-inventive) examples are recorded in Tables 2. Inventive examples are listed in Tables 3 and 4. Table 5 presents a pressure drop comparison between a filter prepared in accordance with the present invention, and two comparative cordierite DPFs.

In preparing the samples, inorganic powders were weighed together with solid organic binders and lubricants into a Nalgene® jar and mixed on a Turbula® mixer for 20 minutes. The dry ingredients were transferred to a muller where any liquid organics and water were gradually added and the mixture mulled to a plastic consistency.

The mulled batch was extruded three times as spaghetti, then formed into one-inch diameter or two-inch diameter, 200 cell/in$^2$, 0.019–0.022" wall honeycomb. For some compositions, 5/16" rod and 0.020" ribbon were also extruded. One-inch diameter honeycomb was wrapped in aluminum foil while the rod was placed inside a glass tube with the ends loosely covered with foil The ribbon was cut into 1.5 inch long segments placed between layers of foil, and covered with a weight to ensure flatness. Two-inch diameter honeycomb was partially dried, without wrapping, in a dielectric dryer. All extrudates were then dried for one to three days in an oven at 95° C.

Extruded samples were placed on alumina setter sand in alumina boxes. Inventive examples I1 to I6 were fired in an electric kiln at 50° C./hour to a maximum temperature of 1400° or 1425° C. and held for 10 or 25 hours before cooling by shutting off power to the furnace. Examples I7 to I9 were fired to 1430° C. and held for 25 hours. Comparative examples were fired to 1405° C. Hold times and temperatures are reported in Tables 2–4.

Porosity of the fired ware was characterized by mercury intrusion porosimetry, CTE by dilatometry measured along the axial (extrusion) direction, and secondary phases (mullite, corundum, and spinel) by quantitative powder x-ray diffractometry. Transverse I-ratios were measured as described in U.S. Pat. No. 5,258,150. MOR, where measured, was by four-point loading on the solid rod. Permeability was measured on pieces of extruded ribbon using a Perm Automated Porometer® Version 6.0 (Porous Materials, Inc., Ithaca, N.Y.). Permeability values are expressed in units of $\mu m^2$. The "Darcy," another unit of permeability, is equal to 0.987 $\mu m^2$. All percentages are weight percents, and all pore sizes and particles sizes are in microns ($10^{-6}$ meter).

The pressure drop across the two-inch diameter, six-inch long cellular filter bodies was measured as follows. Each filter was wrapped in a ceramic fibrous mat and securely encased in a cylindrical metal holder. The holder and filter were attached at each end to metal pipes through which a stream of air was passed. The pressure drop across the filter, that is, the pressure difference between the inlet and outlet faces, was measured as a function of gas flow rate. Flow rates of 1.9 to 26.25 standard cubic feet per minute (scfm) were utilized for all examples. The pressure drops for these examples, prior to the introduction of carbon particles into the filters, are referred to as the "clean" pressure drops, and these clean pressure drops increase with increasing flow rate.

After the clean pressure drops were measured, the samples were transferred to a second laboratory facility where they were again attached to a metal pipe into which a stream of air was passed at a flow rate of about 13 scfm. A very fine "artificial" carbon was then aspirated into this air stream for a period of time, thereby partially loading the filter with carbon by coating the walls of the inlet channels with a layer of carbon particles. The "artificial" carbon used in the laboratory experiments is commercially available copier toner. For purposes of the present invention this "artificial" carbon will be referred to as carbon or carbon soot.

The sample was then taken back to the first apparatus and its pressure drop re-measured as a function of flow rate. This process was repeated for various increasing levels of carbon soot loading. Thus, pressure drops were determined as a function of flow rate and mass of carbon soot contained within the filter. In most cases, levels of carbon soot loading ranged from approximately 0.3 to 5.0 grams per liter of filter volume. The conditions of the test method described above are meant to provide a relative comparison of the behaviors of the filters in environments of flowing gas and carbon soot build-up on the walls of the filter, analogous to the environment that a filter would experience if placed in the exhaust path of a diesel engine. To minimize reduction in engine performance, it is desired that the pressure drop of a filter that is loaded with a given mass per volume of carbon soot be as low as possible. Pressure drop data in Table 5 and FIG. 6 were measured at a flow rate of 26.25 scfm, at room temperature of 25° C.

Comparative Examples C1 to C3 are provided according to the teachings of U.S. Pat. No. 5,258,150. Comparative Example C4 is a cordierite ceramic based upon raw materials comprising an MgO-forming source, an $Al_2O_3$-forming source, and a silica source, that does not meet one or more of the property requirements.

Figure 1:
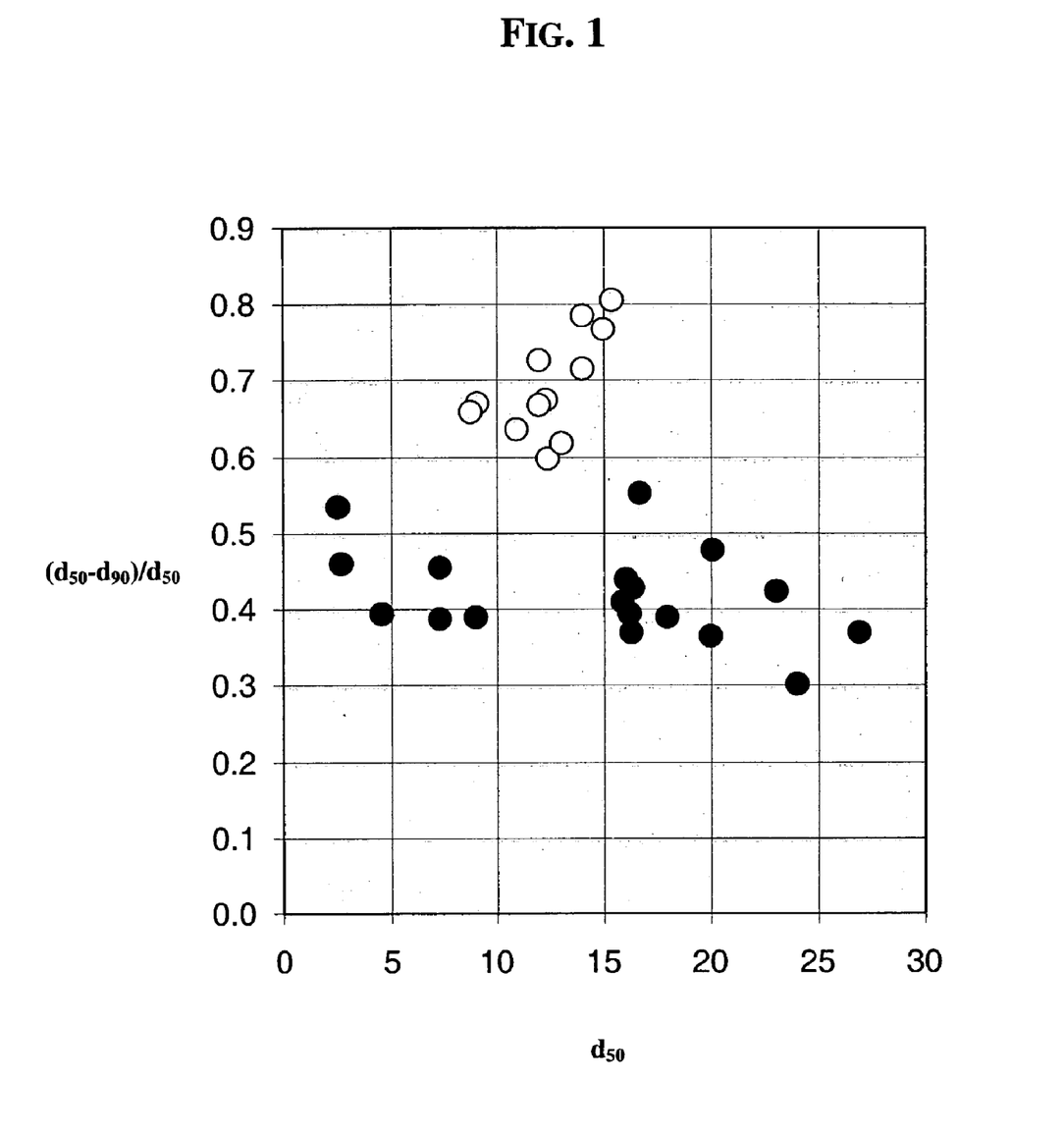
FIG. 1 is a plot of $(d_{50}-d_{90})/d_{50}$ versus $d_{50}$ for comparative and inventive samples.
Figure 2:
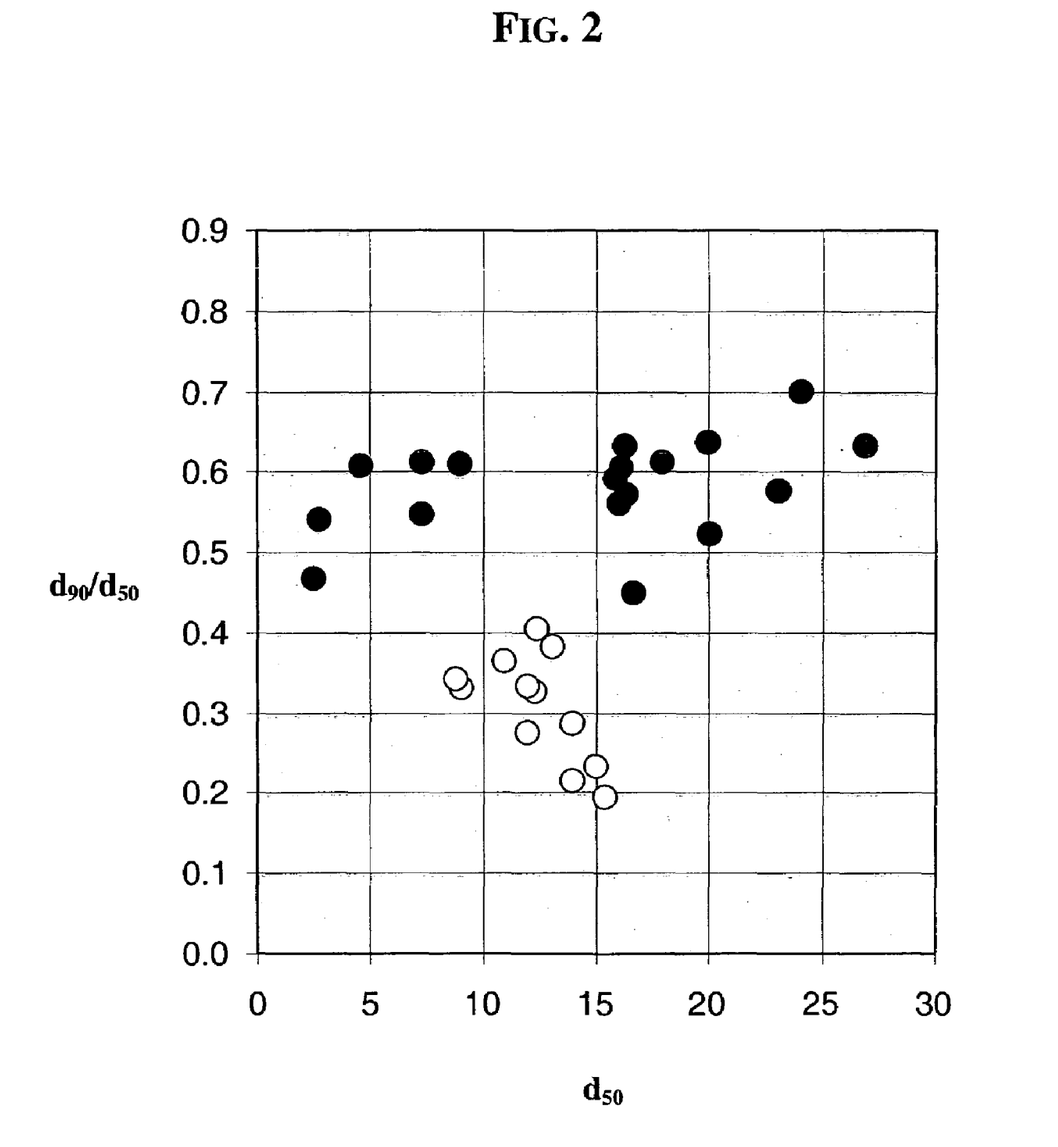
FIG. 2 is a plot of $d_{90}/d_{50}$ versus $d_{50}$ for comparative and inventive samples.
Figure 3:
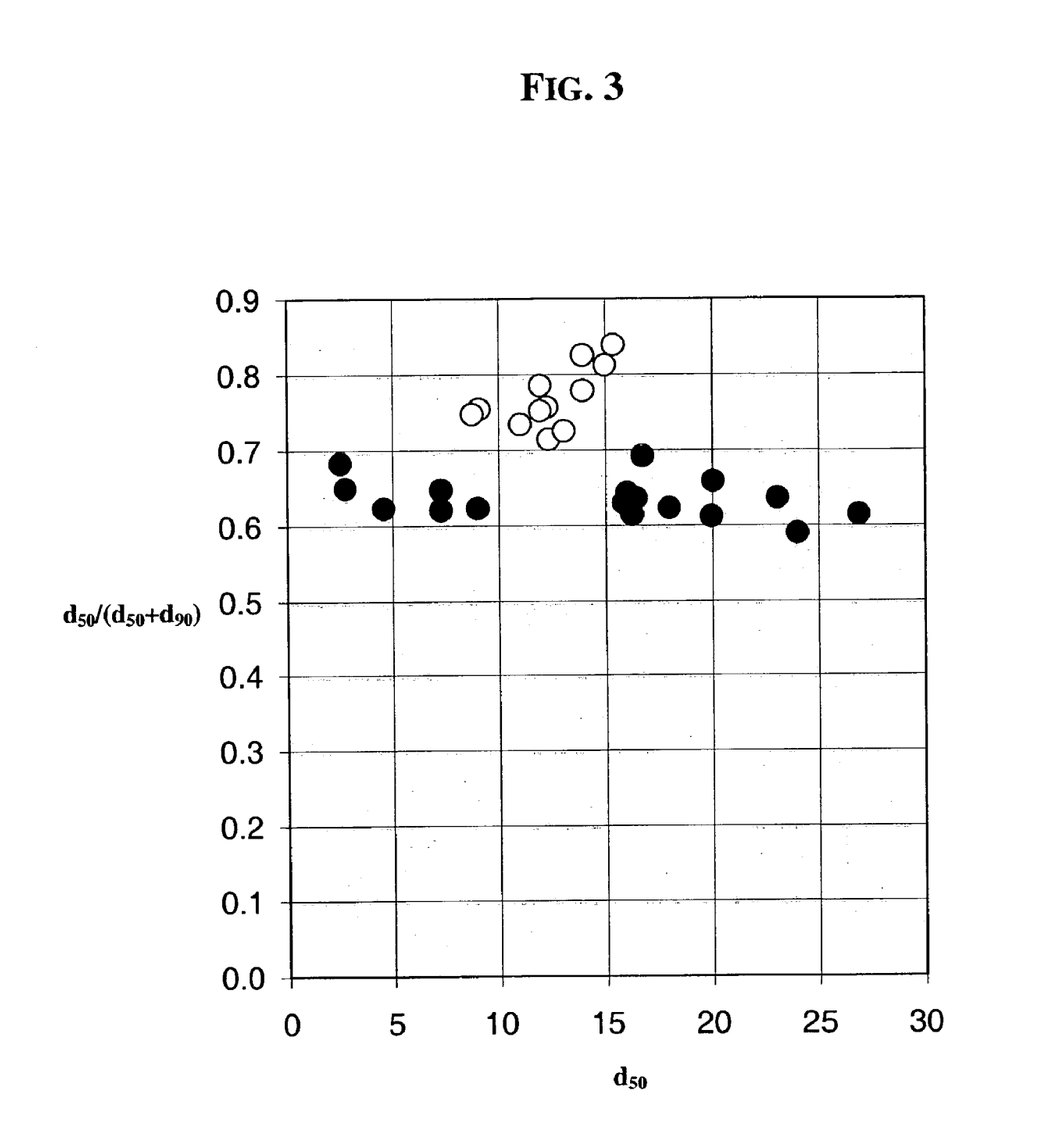
FIG. 3 is a plot of $d_{50}/(d_{50}+d_{90})$ versus $d_{50}$ for comparative and inventive samples.

FIGS. 1 to 3 illustrate the pore size distribution of comparative examples made with clay and talc, and without an MgO-forming source (open circles) in comparison to inventive examples (filled circles). It can be observed that bodies based upon raw material mixtures containing talc and clay and absent an MgO-forming source possess a much broader pore size distribution than the inventive examples based upon a raw material mixture comprised of an MgO-forming source, an alumina-forming source, and a silica-forming source.

Figure 4:
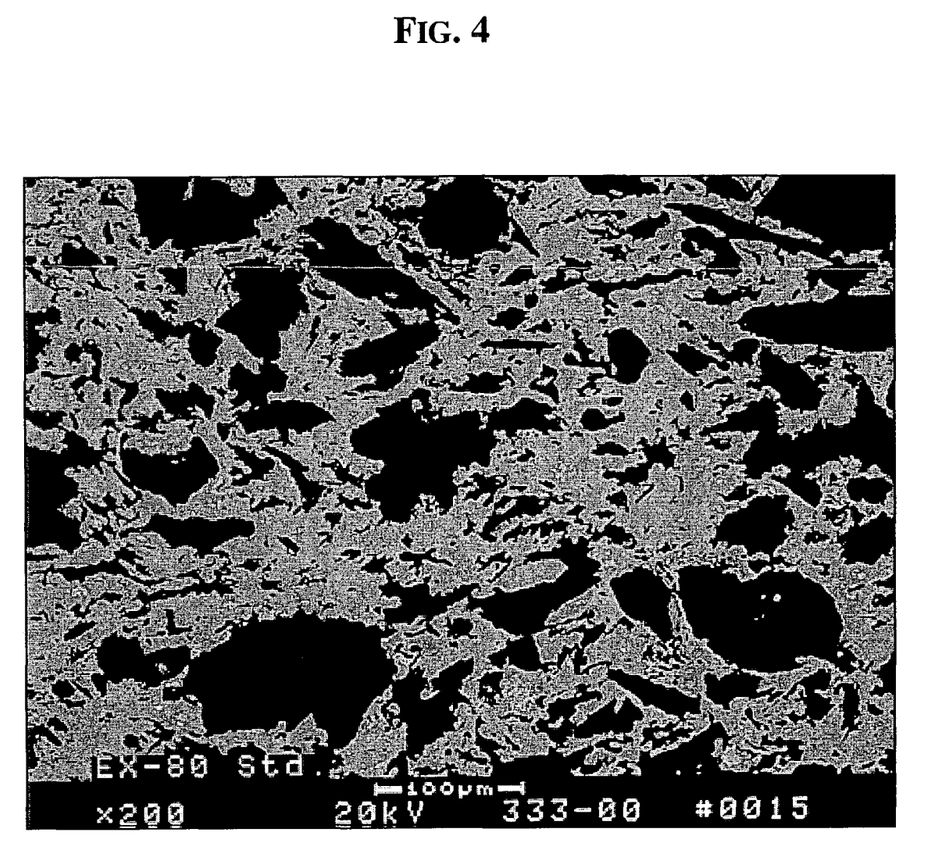
FIG. 4 is back-scattered scanning electron micrograph showing the microstruture of a commercially available cordierite DPF.

A back-scattered scanning electron micrograph of a commercially available cordierite diesel particulate filter made with clay and talc, and without an MgO-forming source is provided in FIG. 4. The "ragged" microstructure is typified by anisotropic, angular pores having very jagged surfaces and exhibiting a broad range in pore size. Large pores are frequently connected only by narrow pore necks.

Figure 5:
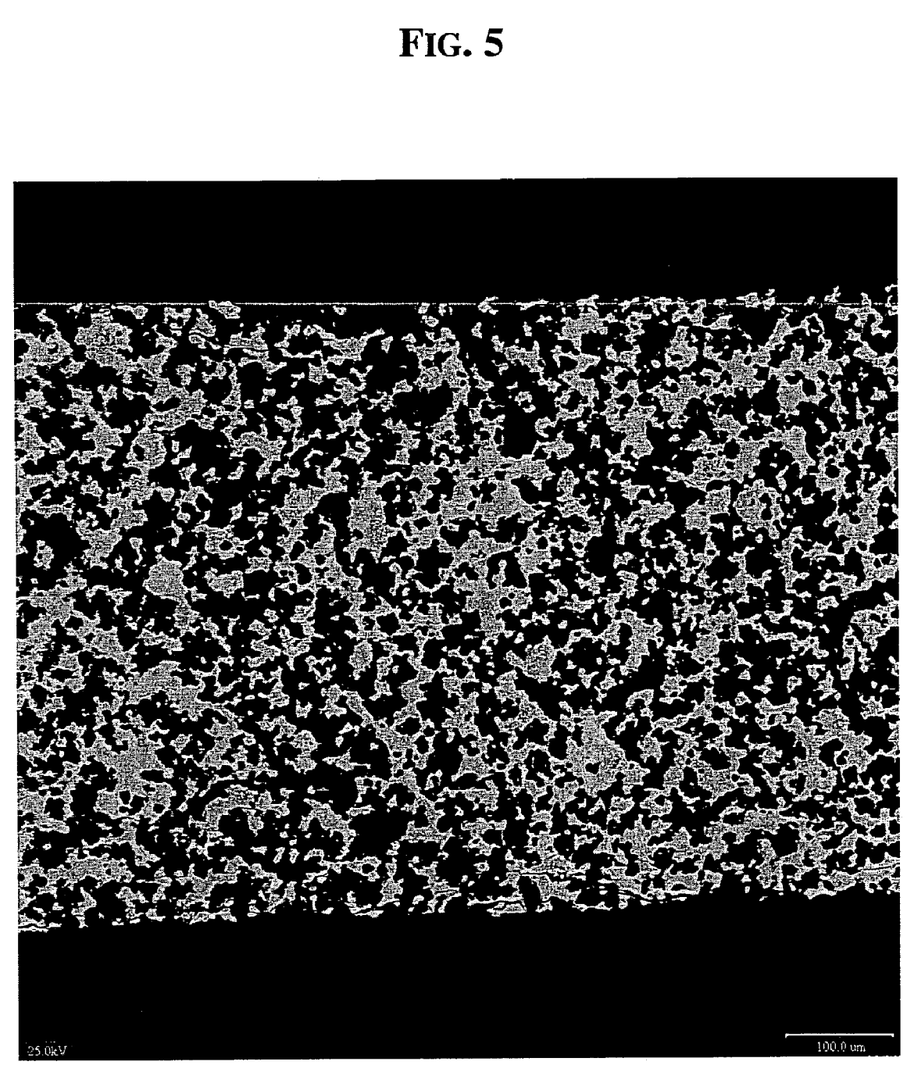
FIG. 5 is a back-scattered electron micrograph showing the microstructure of inventive example I9.

In FIG. 5 the microstructure of inventive example I9 is shown. The inventive examples based upon a raw material mixture comprised of an MgO-forming source, an alumina-forming source, and a silica-forming source possess a much narrower pore size distribution than the comparative examples based upon raw material mixtures containing talc and clay that are absent of an MgO-forming source. The microstructure is less anisotropic and has a much smoother pore-wall surface.

Figure 6:
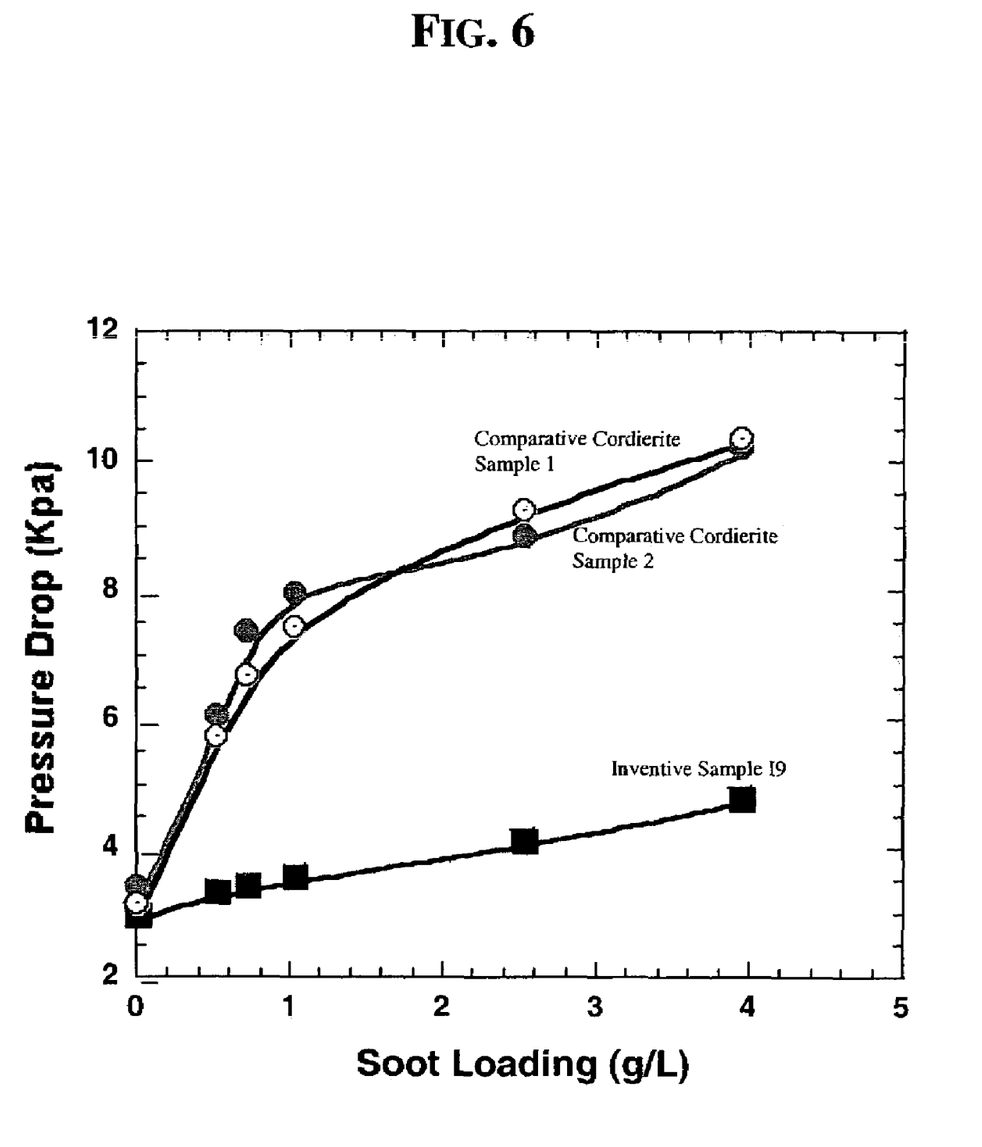
FIG. 6 compares the pressure drop as a function of carbon soot loading at a gas flow rate of 26.25 scfm, as measured at room temperature (25° C.) for two comparative DPF samples (diameter of 2 in., length of 6 in., cell density of 200 cells/in.$^2$; wall thickness of 0.022 in.), and an inventive DPF made according to the present invention (diameter of 2 in., length of 6 in., cell density of 200 cells/in.$^2$; wall thickness of 0.022 in.).

A comparison of pressure drop and selected physical properties is provided in Table 5 for two comparative cordierite DPFs, commercially available from Corning Incorporated, and a filter fabricated according to the present invention (example I9 in Table 4). The samples have a cell density of 200 cells per square inch and a wall thickness of 0.016 and 0.022 inches. The pressure drop was measured for carbon soot loadings varying from zero to 4 g/L at a flow rate of 26.25 scfm. FIG. 6 illustrates graphically the pressure drop versus carbon soot loading. As it can be seen the inventive sample I9 has the lowest pressure drop at all loadings of carbon soot, in comparison with the comparative cordierite DPFs.

It should be understood that while the present invention has been described in detail with respect to certain illustrative and specific embodiments thereof, it should not be considered limited to such but may be used in other ways without departing from the spirit of the invention and the scope of the appended claims.

TABLE 1

Raw Materials

| Raw Material | $d_{10}$ | $d_{50}$ | $d_{90}$ |
|---|---|---|---|
| MgO-Yielding Source | | | |
| Magnesium Hydroxide 1 (Dow T-100) | — | 6.5 | — |
| Magnesium Oxide 1 (MagChem 50Y) | 1.7 | 3.5 | 7.0 |
| Magnesium Oxide 2 (MagChem 10-325S) | 4.1 | 15.0 | 33.7 |
| Magnesium Oxide 3 (M-1 milled −150 mesh) | 1.4 | 13.8 | 50.4 |
| Magnesium Oxide 4 (MagChem 20) | — | 1.0* | — |
| Talc | | | |
| Talc 2 (FDC) | — | 8.0* | — |
| Talc 3 (China 1) | — | 10.0* | — |
| Talc 4 (Quebec) | — | 7.0* | — |
| Spinel | | | |
| Spinel 1 | — | 1.0 | — |
| Kaolin | | | |
| Kaolin 1 (K10) | — | 3.2 | — |
| $Al_2O_3$-Yielding Source | | | |
| Alumina 1 (Alcan C701) | 3.5 | 5.6–7.0* | 10.4 |

TABLE 1-continued

Raw Materials

| Raw Material | $d_{10}$ | $d_{50}$ | $d_{90}$ |
|---|---|---|---|
| Alumina 2 (A16) | — | 0.6 | — |
| Alumina 3 (Alcoa A3000FL) | 0.4 | 1.8–3.5* | 4.1 |
| Alumina 4 (Alcoa A1000SGD) | 0.36 | 0.55 | 1.2 |
| Aluminum Hydroxide 1 (Aluchem AC714) | 3.3 | 5.0 | 7.9 |
| Aluminum Hydroxide 2 (Aluchem AC400) | 2.8 | 11.0 | 22.6 |
| SiO$_2$ Source | | | |
| Silica 1 (Imsil A25) | 1.0 | 4.6 | 16.3 |
| Silica 2 (Imsil A75) | 1.2 | 15.4 | 56.9 |
| Silica 3 (Silcosil 75) | 3.4 | 24.3 | 64.2 |
| Silica 4 (Supersil –200 mesh) | — | 20.0 | — |
| Silica 5 (Berkeley S5) | — | 100# | — |
| Pore Former | | | |
| Pore Former 1 (Asbury 4434 graphite) | — | 101 | — |
| Pore Former 2 (Superior 5026 graphite) | — | 39 | — |
| Pore Former 3 (Cellulose) | — | — | — |
| Pore Former 4 (CornStarch) | 11 | 15 | 20 |

*Sedigraph; # Sieve analysis

TABLE 2

Comparative Examples

| Example Number | C1 | C2 | C3 | C4 |
|---|---|---|---|---|
| Hold Temp (° C.) | 1400 | 1400 | 1400 | 1425 |
| Hold Time (hrs) | 7 | 7 | 7 | 25 |
| Methocel | 3.0 | 3.0 | 3.0 | 5.0 |
| Sodium Stearate | 0.5 | 0.5 | 0.5 | 0 |
| Emersol | 0 | 0 | 0 | 0.6 |
| Durasyn | 0 | 0 | 0 | 6.0 |
| Talc 2 | 0 | 0 | 40.7 | 0 |
| Talc 3 | 39.9 | 0 | 0 | 0 |
| Talc 4 | 0 | 39.9 | 0 | 0 |
| Kaolin 1 | 16.6 | 16.6 | 16.0 | 0 |
| Alumina 1 | 15.0 | 15.0 | 0 | 0 |
| Alumina 2 | 0 | 0 | 14.8 | 0 |
| Alumina 3 | 0 | 0 | 0 | 0 |
| Alumina 4 | 0 | 0 | 0 | 34.86 |
| Aluminum Hydroxide 1 | 15.8 | 15.8 | 16.0 | 0 |
| Magnesium Oxide 1 | 0 | 0 | 0 | 13.78 |
| Magnesium Oxide 4 | 0 | 0 | 0 | 0 |
| Silica 1 | 0 | 0 | 0 | 51.36 |
| Silica 4 | 12.7 | 12.7 | 6.3 | 0 |
| Silica 5 | 0 | 0 | 6.3 | 0 |
| Total Intrusion Volume | — | — | — | 0.2651 |
| % Porosity | 45.0 | 43.0 | 47.0 | 39.6 |
| $d_{90}$ | 3.0 | 4.0 | 3.0 | 1.2 |
| $d_{50}$ | 15.4 | 12.3 | 14 | 2.6 |
| $d_{10}$ | 40.0 | 35.0 | 57.5 | 4.1 |
| $(d_{10}-d_{90})/d_{50}$ | 2.40 | 2.52 | 3.89 | 1.13 |
| $(d_{10}-d_{50})/d_{50}$ | 1.60 | 1.85 | 3.11 | 0.60 |
| $(d_{50}-d_{90})/d_{50}$ | 0.81 | 0.67 | 0.79 | 0.53 |
| $d_{90}/d_{50}$ | 0.19 | 0.33 | 0.21 | 0.47 |
| $d_{50}/(d_{50}+d_{90})$ | 0.84 | 0.75 | 0.82 | 0.68 |
| $S_f$ | 1.87 | 1.74 | 1.74 | 1.70 |
| Permeability ($10^{-12}$ m$^2$) | — | — | — | 0.025 |
| CTE (25–800) ($10^{-7}$/° C.) | 3.4 | 0.9 | 1.4 | 6.7 |
| Transverse I-ratio | 0.88 | 0.90 | 0.89 | 0.72 |

TABLE 3

Inventive Examples

| Example Number | I1 | I2 | I3 | I4 | I5 |
|---|---|---|---|---|---|
| Hold Temp (° C.) | 1425 | 1425 | 1425 | 1425 | 1425 |
| Hold Time (hrs) | 10 | 10 | 10 | 25 | 10 |
| Methocel | 4.0 | 4.0 | 4.0 | 5.0 | 4.0 |
| Emersol | 1.0 | 1.0 | 1.0 | 0.6 | 1.0 |
| Durasyn | 6.0 | 6.0 | 6.0 | 6.0 | 10.0 |
| Magnesium Oxide 2 | 0 | 0 | 0 | 0 | 0 |
| Magnesium Oxide 4 | 0 | 0 | 0 | 13.8 | 10.3 |
| Magnesium Hydroxide 1 | 16.0 | 16.0 | 18.8 | 0 | 0 |
| Alumina 1 | 0 | 0 | 32.84 | 0 | 28.9 |
| Alumina 4 | 0 | 0 | 0 | 0 | 0 |
| Aluminum Hydroxide 1 | 0 | 42.8 | 0 | 34.9 | 0 |
| Aluminum Hydroxide 2 | 42.8 | 0 | 0 | 0 | 0 |
| Silica 1 | 41.2 | 0 | 48.4 | 0 | 50.7 |
| Silica 2 | 0 | 0 | 0 | 51.4 | 0 |
| Silica 3 | 0 | 41.2 | 0 | 0 | 0 |
| Total Intrusion Volume | 0.3406 | 0.3546 | 0.3092 | 0.2781 | 0.4340 |
| % Porosity | 42.7 | 44.9 | 41.7 | 41.2 | 52.9 |
| $d_{90}$ | 5.5 | 7.5 | 4.5 | 12.7 | 4.0 |
| $d_{50}$ | 9.0 | 16.7 | 7.3 | 20.0 | 7.3 |
| $d_{10}$ | 10.5 | 35.0 | 10.5 | 36.6 | 10.5 |
| $(d_{10}-d_{90})/d_{50}$ | 0.55 | 1.65 | 0.82 | 1.20 | 0.89 |
| $(d_{10}-d_{50})/d_{50}$ | 0.16 | 1.09 | 0.43 | 0.83 | 0.44 |
| $(d_{50}-d_{90})/d_{50}$ | 0.39 | 0.55 | 0.39 | 0.36 | 0.45 |
| $d_{90}/d_{50}$ | 0.61 | 0.45 | 0.61 | 0.64 | 0.55 |
| $d_{50}/(d_{50}+d_{90})$ | 0.62 | 0.69 | 0.62 | 0.61 | 0.65 |
| $S_f$ | 1.29 | 1.53 | 1.47 | 1.48 | 1.23 |
| Permeability ($10^{-12}$ m$^2$) | 0.43 | 1.41 | 0.37 | 2.03 | 0.455 |
| CTE (25–800) ($10^{-7}$/° C.) | 17.0 | 16.6 | 13.0 | 15.5 | 12.7 |
| Transverse I-ratio | 0.78 | 0.84 | 0.80 | 0.72 | 0.83 |
| MOR rod (psi) | 2326 | 3003 | 2256 | — | 2044 |

TABLE 4

Inventive Examples

| Example Number | 16 | 17 | 18 | 19 |
|---|---|---|---|---|
| Hold Temp (° C.) | 1430 | 1430 | 1430 | 1430 |
| Hold Time (hrs) | 25 | 25 | 25 | 25 |
| Methocel | 4.0 | 4.0 | 4.0 | 4.0 |
| Emersol | 0 | 0 | 0 | 0 |
| Durasyn | 0 | 0 | 0 | 0 |
| Magnesium Oxide 4 | 14.0 | 14.0 | 14.0 | 14.0 |
| Alumina 1 | 35.0 | 0 | 35.0 | 0 |
| Alumina 3 | 0 | 35.0 | 0 | 35.0 |
| Alumina 4 | 0 | 0 | 0 | 0 |
| Silica 1 | 51.0 | 51.0 | 51.0 | 51.0 |
| Silica 4 | 0 | 0 | 0 | 0 |
| Pore Former 4 | 10.0 | 10.0 | 10.0 | 10.0 |
| Total Intrusion Volume | — | — | — | — |
| % Porosity | 46.0 | 44.0 | 49.0 | 48.0 |
| $d_{90}$ | 3.6 | 2.0 | 5.2 | 2.4 |
| $d_{50}$ | 6.9 | 4.4 | 8.6 | 4.6 |
| $d_{10}$ | 10.2 | 6.1 | 12.7 | 6.7 |
| $(d_{10}-d_{90})/d_{50}$ | 0.95 | 0.93 | 0.87 | 0.93 |
| $(d_{10}-d_{50})/d_{50}$ | 9.48 | 0.39 | 0.48 | 0.45 |
| $(d_{50}-d_{90})/d_{50}$ | 0.48 | 0.54 | 0.40 | 0.48 |
| $d_{90}/d_{50}$ | 0.52 | 0.45 | 0.60 | 0.52 |
| $d_{50}/(d_{50} + d_{90})$ | 0.66 | 0.69 | 0.62 | 0.66 |
| $S_f$ | 1.44 | 1.52 | 1.23 | 1.40 |
| Permeability ($10^{-12}$ m$^2$) | — | — | — | — |
| CTE (25–800) ($10^{-7}$/° C.) | 5.0 | 4.35 | 5.75 | 5.0 |
| Pressure Drop at 5 g/L soot, measured at 26.25 scfm (kPa) | 7.9 | 8.75 | 5.15 | 7.60 |
| Transverse I-ratio | — | — | — | — |
| MOR rod (psi) | — | — | — | — |

TABLE 5

Pressure Drop Comparison for Inventive and Commercial DPFs

| Sample Type | Inventive Cordierite DFP | Commercial Cordierite DPF | Commercial Cordierite DPF |
|---|---|---|---|
| Soot Loading (g/L) | | Pressure Drop (kPa) | |
| 0.00 | 2.99 | 3.15 | 3.41 |
| 0.50 | 3.34 | 5.73 | 6.06 |
| 0.70 | 3.43 | 6.70 | 7.38 |
| 1.00 | 3.56 | 7.44 | 7.97 |
| 2.50 | 4.14 | 9.26 | 8.87 |
| 4.00 | 4.80 | 10.4 | 10.2 |
| 5.00 | 5.2 | 11.0 | 11.3 |
| 10.00 | 7.2 | 15.2 | 15.3 |
| % Porosity | 49 | 49 | 43 |
| $d_{10}$(μm) | 12.7 | 24 | 24 |
| $d_{50}$(μm) | 8.6 | 13 | 13 |
| $d_{90}$(μm) | 5.2 | 2 | 5 |
| $d_{50}/(d_{50} + d_{90})$ | 0.64 | 0.86 | 0.72 |
| $S_f$ | 1.23 | 1.75 | 1.67 |

What is claimed is:

1. A ceramic filter for trapping and combusting diesel exhaust particulates comprising an end-plugged cordierite honeycomb structure, wherein:

a quantity $d_{50}/(d_{50}+d_{90})$ as related to pore size distribution is less than 0.70;

a soot loaded permeability factor $S_f$ as defined by the equation $$[d_{50}/(d_{50}+d_{90})]/[\% \text{ porosity}/100], \text{ is less than } 1.55;$$

a coefficient of thermal expansion (25–800° C.) is no greater than $17\times10^{-7}$/° C., and median pore diameter, $d_{50}$, is less than 15 micrometer.

2. A ceramic filter according to claim 1 wherein the soot loaded permeability factor $S_f$, is between 0.83 and 1.40.

3. A ceramic filter according to claim 2 wherein the soot loaded permeability factor $S_f$, is between 0.83 and 1.35.

4. A ceramic filter according to claim 1 wherein the quantity $d_{50}/(d_{50}+d_{90})$ is less than 0.65.

5. A ceramic filter according to claim 2 wherein the quantity $d_{50}/(d_{50}+d_{90})$ is less than 0.60.

6. A ceramic filter according to claim 1 wherein the coefficient of thermal expansion (25–800° C.) is less than $10\times10^{-7}$/° C.

7. A ceramic filter according to claim 6 wherein the coefficient of thermal expansion (25–800° C.) is less than $5\times10^{-7}$/° C.

8. A ceramic filter according to claim 1 wherein a median pore diameter, $d_{50}$, is at least 4 micrometers and less than 15 micrometers.

9. A ceramic filter according to claim 8 wherein the median pore diameter, $d_{50}$, is between 6 micrometers and 15 micrometers.

10. A ceramic filter according to claim 9 wherein median pore diameter, $d_{50}$, is between 7 micrometers and 15 micrometers.

11. A ceramic filter according to claim 1 wherein a quantity $d_{90}/d_{50}$ as related to pore size distribution is greater than 0.40.

12. A ceramic filter according to claim 11 wherein the quantity $d_{90}/d_{50}$ as related to pore size distribution is greater than 0.55.

13. A ceramic filter according to claim 12 wherein the quantity $d_{90}/d_{50}$ as related to pore size distribution is greater than 0.60.

14. A ceramic filter according to claim 1 wherein a quantity $(d_{50}-d_{90})/d_{50}$ as related to pore size distribution is less than 0.60.

15. A ceramic filter according to claim 1 wherein the quantity $(d_{50}-d_{90})/d_{50}$ as related to pore size distribution is less than 0.50.

16. A ceramic filter according to claim 1 wherein the quantity $(d_{50}-d_{90})/d_{50}$ as related to pore size distribution is less than 0.40.

17. A ceramic filter according to claim 1 wherein a porosity is at least 40% by volume, and less than 60%.

18. A ceramic filter according to claim 17 wherein the porosity is 50% by volume.

19. A ceramic filter according to claim 18 wherein the porosity is 55% by volume.

20. A ceramic filter according to claim 1 wherein a filter volumetric heat capacity is at least 0.67 J cm$^{-3}$ K$^{-1}$ at 500° C.

21. A ceramic filter according to claim 1 wherein the filter volumetric heat capacity is at least 0.76 J cm$^{-3}$ K$^{-1}$ at 500° C.

22. A ceramic filter according to claim 1 wherein the filter volumetric heat capacity is at least 0.85 J cm$^{-3}$ K$^{-1}$ at 500° C.

23. A method for fabricating a wall-flow filter and comprising:

(a) forming a batch of raw materials comprising magnesium oxide, alumina and silica raw materials in combination with extrusion forming aids;

(b) plasticizing and shaping the batch, wherein the shaping is done through an extrusion die to form a green honeycomb body having an inlet end, an outlet end, and a multiplicity of cells extending from the inlet end to the outlet end;

(c) drying and firing the green honeycomb body to form a structure which is predominately of a phase approximating the stoichiometry of $Mg_2Al_4Si_5O_{18}$ and exhibits a pore size distribution as determined by mercury porosimetry in which the quantity $d_{50}/(d_{50}+d_{90})$ is less than 0.70; a soot loaded permeability factor $S_f$, as defined by the equation $[d_{50}/(d_{50}+d_{90})]/[\% \text{ porosity}/100]$, of less than 1.55; and, a coefficient of thermal expansion (25–800° C.) of no greater than $17 \times 10^{-7}/°$ C.;

(d) plugging a first portion of cells at the inlet end, and a second portion of cells at the outlet end such that each cell is plugged at only one end.

24. The method of claim 23 wherein the batch further includes spinel having a stoichiometry of $MgAl_2O_4$.

25. The method of claim 23 wherein the batch further includes a pore former.

26. The method of claim 25 wherein the pore former is selected from the group consisting of graphite, cellulose, starch, polyacrylates and polyethylenes, and combinations thereof.

27. The method of claim 26 wherein the pore former has a median particle diameter of 3–140 micrometers.

28. The method of claim 27 wherein the pore former has a median particle diameter of 5–80 micrometers.

29. The method of claim 28 wherein the pore former has a median particle diameter of 10–50 micrometers.

30. The method of claim 23 wherein magnesium oxide is supplied from the group consisting of magnesium oxide, magnesium hydroxide, magnesium carbonate, magnesium nitrate and mixtures thereof.

31. The method of claim 23 wherein the alumina is supplied from the group consisting of aluminum oxide, aluminum hydroxide, hydrated alumina, alpha alumina, gamma-alumina, rho-alumina, boehmite, aluminum nitrate, aluminum carbonate and mixtures thereof.

32. The method of claim 23 wherein the silica is supplied from the group consisting quartz, cristobalite, fused silica, sol-gel silica, zeolite, colloidal silica, alpha quartz, and mixtures thereof.

33. The method of claim 23 wherein the extrusion forming aids comprise 2–10% by weight methylcellulose as binder, and 0.5–1.0% by weight sodium stearate as lubricant.

34. The method of claim 23 wherein the firing is done at a rate of 15–100° C./hr to a maximum temperature of 1405–1430° C., with a hold of 6–25 hrs.

* * * * *